United States Patent
Ahn et al.

(10) Patent No.: US 6,512,037 B1
(45) Date of Patent: Jan. 28, 2003

(54) SILICONE COMPOSITION AND CURED SILICONE PRODUCT

(75) Inventors: Dongchan Ahn, Midland, MI (US); Michael Andrew Lutz, Hope, MI (US)

(73) Assignee: Dow Corning Corporation, Midland, MI (US)

( * ) Notice: Subject to any disclaimer, the term of this patent is extended or adjusted under 35 U.S.C. 154(b) by 48 days.

(21) Appl. No.: 09/874,954

(22) Filed: Jun. 6, 2001

(51) Int. Cl.[7] .............................................. C08G 77/08
(52) U.S. Cl. ........................ 524/413; 528/15; 524/413
(58) Field of Search ...................... 528/15, 31; 524/413

(56) References Cited

U.S. PATENT DOCUMENTS

| | | | | |
|---|---|---|---|---|
| 4,546,017 A | * | 10/1985 | Flackett et al. | 427/387 |
| 4,742,103 A | * | 5/1988 | Morita et al. | 524/174 |
| 4,749,741 A | * | 6/1988 | Saito et al. | 524/859 |
| 5,364,921 A | * | 11/1994 | Gray et al. | 528/15 |
| 5,595,826 A | | 1/1997 | Gray et al. | 428/450 |

FOREIGN PATENT DOCUMENTS

GB    0 596 534 A2    11/1993    ........... C08L/83/07

* cited by examiner

*Primary Examiner*—Margaret G. Moore
(74) *Attorney, Agent, or Firm*—Larry A. Milco

(57) ABSTRACT

A silicone composition comprising (A) an organopolysiloxane containing an average of at least two silicon-bonded alkenyl groups per molecule, (B) an organohydrogenpolysiloxane containing an average of at least two silicon-bonded hydrogen atoms per molecule in a concentration sufficient to cure the composition, (C) an effective amount of a titanium or zirconium compound having at least one aliphatic carbon-carbon multiple bond, and (D) a catalytic amount of a hydrosilylation catalyst; and a cured silicone product formed from the composition.

21 Claims, No Drawings

SILICONE COMPOSITION AND CURED SILICONE PRODUCT

FIELD OF THE INVENTION

The present invention relates to a silicone composition and more particularly to a hydrosilylation addition-curable silicone composition containing a titanium or zirconium compound having at least one aliphatic carbon-carbon multiple bond. The present invention further relates to a cured silicone product formed from the composition.

BACKGROUND OF THE INVENTION

Silicones are useful in a variety of applications by virtue of their unique combination of properties, including high thermal stability, good moisture resistance, excellent flexibility, high ionic purity, low alpha particle emissions, and good adhesion to various substrates. For example, silicones are widely used in the automotive, electronic, construction, appliance, and aerospace industries.

Addition-curable silicone compositions comprising an alkenyl-containing organopolysiloxane, an organohydrogensiloxane, a titanium compound or zirconium compound, and a hydrosilylation catalyst are known in the art. For example, U.S. Pat. No. 5,364,921 to Gray et al. discloses a composition curable to a silicone rubber, which comprises an alkenyl-containing polydiorganosiloxane, an organohydrogensiloxane, a hydrosilylation catalyst containing platinum, an epoxy-functional organotrialkoxysilane, an alkoxysilicon compound, and a titanium compound having Ti—O—CH bonds.

U.S. Pat. No. 5,683,527 to Angell et al. discloses a foamable, curable organosiloxane composition comprising an alkenyl-functional polyorganosiloxane, an organohydrogensiloxane, a blowing agent, a platinum catalyst, and an adhesion promoter comprising an epoxy-functional compound, a hydroxyl-functional compound, a tetralkylorthosilicate, an organotitanate, and an aluminum or zirconium compound.

U.S. Pat. No. 5,595,826 to Gray et al. discloses organopolysiloxane compositions which cure by the addition reaction of silicon-bonded lower alkenyl radicals with silicon-bonded hydrogen atoms. The compositions comprise an adhesion promoting mixture comprising an epoxy-functional compound, a compound having at least one hydroxy group and, in the same molecule, at least one substituent selected from a group consisting of silicon hydride, alkenyl, and acryl, and an aluminum compound or zirconium compound.

U.S. Pat. No. 4,742,103 to Morita et al. discloses organopolysiloxane compositions curable by a platinum catalyzed hydrosilylation reaction comprising an organosilicon compound containing an ethylenically unsaturated group at least one alkoxy group, and at least one member from a specified class of compounds of aluminum or zirconium.

European Patent Application EP 0 718 432 A1 to Collins discloses a curable coating composition comprising a composition curable by a hydrosilylation reaction and includes a silicone resin, a hydrosilylation reaction inhibitor, and an adhesion promoting additive which comprises an organosilicon compound having epoxy and alkoxy functionalities, an alkenylsilanol, an organotitanium compound, and a metal chelate compound.

European Patent Application EP 0 596 534 A2 to Kasuya et al. discloses a curable organopolysiloxane composition comprising a polyorganosiloxane having at least two alkenyl groups, an organopolysiloxane having at least two silicon-bonded hydrogen atoms, an organosilicon compound having 1 to 20 mole % organosilsesquioxane units, 20 to 80 mole % diorganosiloxane units, and 20 to 80 mole % triorganosiloxy units in which there is at least one epoxy group per molecule, at least 2 mole % of the organic groups are alkenyl, and at least 5 mole % of the organic groups are silicon-bonded alkoxy groups, an organotitanium compound, and a hydrosilylation-reaction catalyst.

Although, the aforementioned references disclose silicone compositions containing various titanium and zirconium compounds, none of the references teach the transition metal compound of the present invention.

SUMMARY OF THE INVENTION

The present invention is directed to a silicone composition comprising:
  (A) an organopolysiloxane containing an average of at least two silicon-bonded alkenyl groups per molecule;
  (B) an organohydrogenpolysiloxane containing an average of at least two silicon-bonded hydrogen atoms per molecule in a concentration sufficient to cure the composition;
  (C) an effective amount of a transition metal compound having a formula selected from:

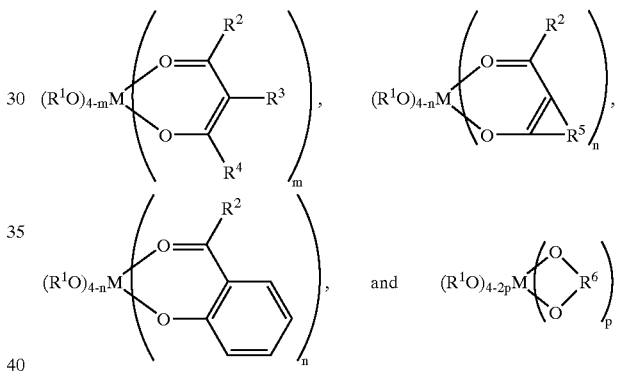

wherein each $R^1$ is independently hydrocarbyl, $-(R^7O)_qR^8$, $-SiR^9{}_2(OSiR^9{}_2)_rOSiR^9{}_3$, epoxy-substituted hydrocarbyl, acryloyloxy-substituted hydrocarbyl, methacryloyloxy-substituted hydrocarbyl, amino-substituted hydrocarbyl, or hydrocarbylamino-substituted hydrocarbyl, wherein $R^7$ is hydrocarbylene, $R^8$ is hydrocarbyl, $R^9$ is hydrocarbyl, q is from 1 to 20, and r is from 0 to 20; each $R^2$ is independently hydrocarbyl, halohydrocarbyl, cyanoalkyl, alkoxy, alkenyloxy, alkenyloxyalkyloxy, cyanoalkoxy, methacryloyloxyalkyloxy, acryloyloxyalkyloxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; M is titanium or zirconium; m is an integer from 0 to 3 when M is titanium or an integer from 0 to 4 when M is zirconium; n is an integer from 1 to 3 when M is titanium or an integer from 1 to 4 when M is zirconium; and p is 1 or 2; provided at least one $R^1$, $R^2$, $R^3$, $R^4$, $R^5$, or $R^6$ per molecule contains at least one aliphatic carbon-carbon multiple bond; and
  (D) a catalytic amount of a hydrosilylation catalyst.

The present invention is further directed to a cured silicone product comprising a reaction product of the above-described composition.

The present invention is still further directed to a multi-part silicone composition comprising components (A) through (D) in two or more parts, provided components (A), (B), and (D) are not present in the same part.

The silicone composition of the present invention has numerous advantages, including low VOC (volatile organic compound) content and adjustable cure. Moreover, the silicone composition cures to form a silicone product having superior adhesion to a wide variety of substrates, particularly plastics.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

DETAILED DESCRIPTION OF THE INVENTION

As used herein, the term "aliphatic carbon-carbon multiple bond" refers to an aliphatic carbon-carbon double bond or carbon-carbon triple bond.

A silicone composition according to the present invention comprises:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an effective amount of a transition metal compound having a formula selected from:

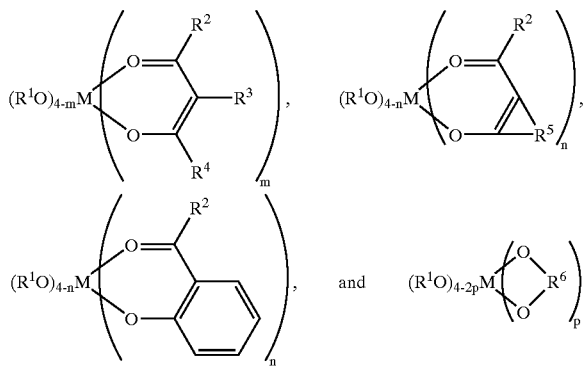

wherein each $R^1$ is independently hydrocarbyl, —$(R^7O)_qR^8$ —$SiR^9{}_2(OSiR^9{}_2)_rOSiR^9{}_3$, epoxy-substituted hydrocarbyl, acryloyloxy-substituted hydrocarbyl, methacryloyloxy-substituted hydrocarbyl, amino-substituted hydrocarbyl, or hydrocarbylamino-substituted hydrocarbyl, wherein $R^7$ is hydrocarbylene, $R^8$ is hydrocarbyl, $R^9$ is hydrocarbyl, q is from 1 to 20, and r is from 0 to 20; each $R^2$ is independently hydrocarbyl, halohydrocarbyl, cyanoalkyl, alkoxy, alkenyloxy, alkenyloxyalkyloxy, cyanoalkoxy, methacryloyloxyalkyloxy, acryloyloxyalkyloxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; M is titanium or zirconium; m is an integer from 0 to 3 when M is titanium or an integer from 0 to 4 when M is zirconium; n is an integer from 1 to 3 when M is titanium or an integer from 1 to 4 when M is zirconium; and p is 1 or 2; provided at least one $R^1$, $R^2$, $R^3$, $R^4$, $R^5$, or $R^6$ per molecule contains at least one aliphatic carbon-carbon multiple bond; and (D) a catalytic amount of a hydrosilylation catalyst.

Component (A) is at least one organopolysiloxane containing an average of at least two silicon-bonded alkenyl groups per molecule. The organopolysiloxane can have a linear, branched, or resinous structure. The organopolysiloxane can be a homopolymer or a copolymer. The alkenyl groups typically have from 2 to about 10 carbon atoms and are exemplified by, but not limited to, vinyl, allyl, butenyl, and hexenyl. The alkenyl groups in the organopolysiloxane may be located at terminal, pendant, or both terminal and pendant positions. The remaining silicon-bonded organic groups in the organopolysiloxane are independently selected from monovalent hydrocarbon and monovalent halogenated hydrocarbon groups free of aliphatic unsaturation. These monovalent groups typically have from 1 to about 20 carbon atoms, preferably have from 1 to 10 carbon atoms, and are exemplified by, but not limited to alkyl such as methyl, ethyl, propyl, pentyl, octyl, undecyl, and octadecyl; cycloalkyl such as cylcohexyl; aryl such as phenyl, tolyl, xylyl, benzyl, and 2-phenylethyl; and halogenated hydrocarbon groups such as 3,3,3-trifluoropropyl, 3-chloropropyl, dichlorophenyl, and 6,6,6,5,5,4,4,3,3-nonafluorohexyl. Preferably, at least 50 percent, and more preferably at least 80%, of the organic groups free of aliphatic unsaturation in the organopolysiloxane are methyl.

The viscosity of the organopolysiloxane at 25° C., which varies with molecular weight and structure, is typically from 0.05 to 500 Pa·s, preferably from 0.1 to 200 Pa·s, and more preferably from 0.1 to 100 Pa·s.

Examples of organopolysiloxanes include, but are not limited to, polydiorganosiloxanes having the following formulae: $ViMe_2SiO(Me_2SiO)_cSiMe_2Vi$, $ViMe_2SiO(Me_2SiO)_{0.25c}(MePhSiO)_{0.75c}SiMe_2Vi$, $ViMe_2SiO(Me_2SiO)_{0.95c}(Ph_2SiO)_{0.05c}SiMe_2Vi$, $ViMe_2SiO(Me_2SiO)_{0.98c}(MeViSiO)_{0.02c}SiMe_2Vi$, $Me_3SiO(Me_2SiO)_{0.95c}(MeViSiO)_{0.05c}SiMe_3$, and $PhMeViSiO(Me_2SiO)_cSiPhMeVi$; where Me, Vi, and Ph denote methyl, vinyl, and phenyl respectively and c has a value such that the viscosity of the polydiorganosiloxane is from 0.05 to 500 Pa·s at 25° C.

Methods of preparing polydiorganosiloxanes suitable for use in the silicone composition, such as hydrolysis and condensation of the corresponding organohalosilanes or equilibration of cyclic polydiorganosiloxanes, are well known in the art.

Examples of organopolysiloxane resins include an MQ resin consisting essentially of $R^{10}{}_3SiO_{1/2}$ units and $SiO_{4/2}$ units, a TD resins consisting essentially of $R^{10}SiO_{3/2}$ units and $R^{10}{}_2SiO_{2/2}$ units, an MT resin consisting essentially of $R^{10}{}_3SiO_{1/2}$ units and $R^{10}SiO_{3/2}$ units, and an MTD resin consisting essentially of $R^{10}{}_3SiO_{1/2}$ units, $R^{10}SiO_{3/2}$ units, and $R^{10}{}_2SiO_{2/2}$ units, wherein each $R^{10}$ is independently selected from monovalent hydrocarbon and monovalent halogenated hydrocarbon groups.

The monovalent groups represented by $R^{10}$ typically have from 1 to about 20 carbon atoms and preferably have from 1 to about 10 carbon atoms. Examples of monovalent groups include, but are not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, dichlorophenyl, and 6,6,6,5,5,4,4,3,3-nonafluorohexyl. Preferably, at least one-third, and more preferably substantially all $R^{10}$ groups in the organopolysiloxane resin are methyl. A preferred organopolysiloxane resin consists essentially of $(CH_3)_3SiO_{1/2}$ siloxane units and $SiO_{4/2}$ wherein the mole ratio of $(CH_3)_3SiO_{1/2}$ units to $SiO_{4/2}$ units is from 0.6 to 1.9.

Preferably, the organopolysiloxane resin contains an average of from about 3 to 30 mole percent of alkenyl groups. The mole percent of alkenyl groups in the resin is defined here as the ratio of the number of moles of alkenyl-containing siloxane units in the resin to the total number of moles of siloxane units in the resin, multiplied by 100.

Methods of preparing organopolysiloxane resins are well known in the art. For example, a preferred organopolysiloxane resin is prepared by treating a resin copolymer produced by the silica hydrosol capping process of Daudt et al. with at least an alkenyl-containing endblocking reagent. The method of Daudt et al, is disclosed in U.S. Pat. No. 2,676,182, which is hereby incorporated by reference to teach how to make organopolysiloxane resins suitable for use in the present invention.

Briefly stated, the method of Daudt et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting copolymers generally contain from about 2 to about 5 percent by weight of hydroxyl groups.

The organopolysiloxane resin, which typically contains less than 2 percent by weight of silicon-bonded hydroxyl groups, can be prepared by reacting the product of Daudt et al. with an alkenyl-containing endblocking agent or a mixture of an alkenyl-containing endblocking agent and an endblocking agent free of aliphatic unsaturation in an amount sufficient to provide from 3 to 30 mole percent of alkenyl groups in the final product. Examples of endblocking agents include, but are not limited to, silazanes, siloxanes, and silanes. Suitable endblocking agents are known in the art and exemplified in U.S. Pat. No. 4,584,355 to Blizzard et al.; U.S. Pat No. 4,591,622 to Blizzard et al.; and U.S. Pat. No. 4,585,836 to Homan et al.; which are hereby incorporated by reference. A single endblocking agent or a mixture of such agents can be used to prepare the organopolysiloxane resin.

Component (A) can be a single organopolysiloxane or a mixture comprising two or more organopolysiloxanes that differ in at least one of the following properties: structure, viscosity, average molecular weight, siloxane units, and sequence.

Component (B) is at least one organohydrogenpolysiloxane containing an average of at least two silicon-bonded hydrogen atoms per molecule. It is generally understood that crosslinking occurs when the sum of the average number of alkenyl groups per molecule in component (A) and the average number of silicon-bonded hydrogen atoms per molecule in component (B) is greater than four. The silicon-bonded hydrogen atoms in the organohydrogenpolysiloxane can be located at terminal, pendant, or at both terminal and pendant positions.

The organohydrogenpolysiloxane can be a homopolymer or a copolymer. The structure of the organohydrogenpolysiloxane can be linear, branched, cyclic, or resinous. Examples of siloxane units that may be present in the organohydrogenpolysiloxane include, but are not limited to, $HR^{11}_2SiO_{1/2}$, $R^{11}_3SiO_{1/2}$, $HR^{11}SiO_{2/2}$, $R^{11}_2SiO_{2/2}$, $R^{11}SiO_{3/2}$, and $SiO_{4/2}$ units. In the preceding formulae each $R^{11}$ is independently selected from monovalent hydrocarbon and monovalent halogenated hydrocarbon groups free of aliphatic unsaturation, as defined and exemplified above for component (A). Preferably, at least 50 percent of the organic groups in the organohydrogenpolysiloxane are methyl.

Examples of organohydrogenpolysiloxanes include, but are not limited to, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), a dimethylhydrogensiloxy-terminated polydimethylsiloxane, and a resin consisting essentially of $H(CH_3)_2SiO_{1/2}$ units and $SiO_{4/2}$ units.

Component (B) can be a single organohydrogenpolysiloxane or a mixture comprising two or more organohydrogenpolysiloxanes that differ in at least one of the following properties: structure, average molecular weight, viscosity, siloxane units, and sequence.

The concentration of component (B) in the silicone composition is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. Typically, the concentration of component (B) is sufficient to provide from 0.5 to 5 silicon-bonded hydrogen atoms per alkenyl group in components (A) and (C) combined. Preferably, the concentration of component (B) is sufficient to provide from 0.8 to 2 silicon-bonded hydrogen atoms per alkenyl group in components (A) and (C) combined.

Methods of preparing linear, branched, and cyclic organohydrogenpolysiloxanes, such as hydrolysis and condensation of organohalosilanes, are well known in the art. Methods of preparing organohydrogenpolysiloxane resins are also well known as exemplified in U.S. Pat. Nos. 5,310,843; 4,370,358; and 4,707,531.

To ensure compatibility of components (A) and (B), the predominant organic group in each component is preferably the same. Preferably, this group is methyl.

Component (C) is at least one transition metal compound having a formula selected from:

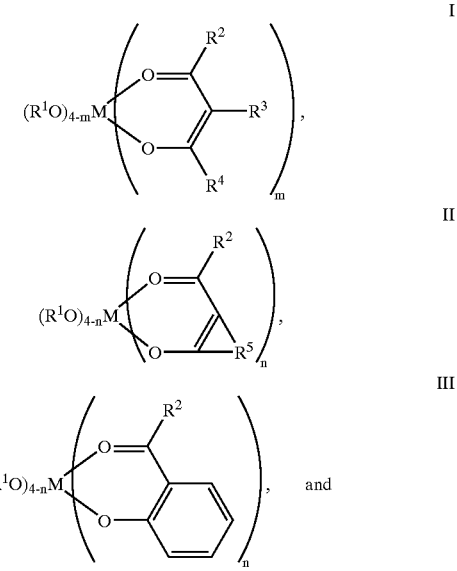

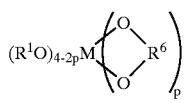

IV wherein each $R^1$ is independently hydrocarbyl, $-(R^7)_qR^8$, $-SiR^9{}_2(OSiR^9{}_2)_rOSiR^9{}_3$, epoxy-substituted hydrocarbyl, acryloyloxy-substituted hydrocarbyl, methacryloyloxy-substituted hydrocarbyl, amino-substituted hydrocarbyl, or hydrocarbylamino-substituted hydrocarbyl, wherein $R^7$ is hydrocarbylene, $R^8$ is hydrocarbyl, $R^9$ is hydrocarbyl, q is from 1 to 20, and r is from 0 to 20; each $R^2$ is independently hydrocarbyl, halohydrocarbyl, cyanoalkyl, alkoxy, alkenyloxy, alkenyloxyalkyloxy, cyanoalkoxy, methacryloyloxyalkyloxy, acryloyloxyalkyloxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; M is titanium or zirconium; m is an integer from 0 to 3 when M is titanium or an integer from 0 to 4 when M is zirconium; n is an integer from 1 to 3 when M is titanium or an integer from 1 to 4 when M is zirconium; and p is 1 or 2; provided at least one $R^1$, $R^2$, $R^3$, $R^4$, $R^5$, or $R^6$ per molecule contains at least one aliphatic carbon-carbon multiple bond. The carbon-carbon multiple bond can be located at an internal or a terminal position. Preferably, the carbon-carbon multiple bond is located at a terminal position, and more preferably it is part of a terminal group having the formula $-CH=CH_2$. Preferably, at least one $R^1$ per molecule contains at least one aliphatic carbon-carbon multiple bond.

The hydrocarbyl, halohydrocarbyl, cyanoalkyl, alkoxy, alkenyloxy, alkenyloxyalkyloxy, cyanoalkoxy, methacryloyloxyalkyloxy, acryloyloxyalkyloxy, and acyl groups in the formulae of the transition metal compound typically have from 1 to 18 carbon atoms and, preferably, have from 1 to 12 carbon atoms.

Examples of hydrocarbyl groups represented by $R^1$, $R^2$, $R^3$, $R^4$, $R^8$, and $R^9$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, propenyl, and hexenyl; arylalkenyl, such as styryl and cinnamyl; and alkynyl, such as ethynyl and propynyl.

Examples of epoxy-subtituted hydrocarbyl groups represented by $R^1$ include, but are not limited to, glycidyl, epoxyethyl, epoxypropyl, epoxybutyl, 1,2-epoxycylohexyl, and epoxydecyl.

Examples of acryloyloxy-substituted hydrocarbyl groups represented by $R^1$ include, but are not limited to, acryloyloxyethyl and $-CH_2C(CH_2O_2CCH=CH_2)_3$.

Examples of methacryloyloxy-substituted hydrocarbyl groups represented by $R^1$ include, but are not limited, methacryloyloxyethyl and methacryloyloxypropyl.

Examples of amino-substituted hydrocarbyl groups include, but are not limited to, aminoethyl, aminopropyl, aminobutyl, and 5-aminopentyl.

Examples of hydrocarbylamino-substituted hydrocarbyl groups include, but are not limited to, methylaminoethyl, dimethylaminopropyl, and diethylaminopropyl.

Examples of groups represented by $R^1$ having the formula $-(R^7)_qR^8$, where $R^7$ and $R^8$, and q are as defined above, include, but are not limited to, $-CH_2OCH_3$, $-CH_2CH_2OCH_3$, $-OCH_2CH_2OCH_2CH_3$, $-CH_2CH_2O$ $(CH_2CH_2O)_3CH_2CH=CH_2$, and $-CH(CH_3)CH_2O[CH(CH_3)CH_2O]_3(CH_2CH_2O)_{10}CH_2CH=CH_2$.

Examples of groups represented by $R^1$ having the formula $-SiR^9{}_2(OSiR^9{}_2)_rOSiR^9{}_3$, where $R^9$ and r are as defined above, include, but are not limited to, $-SiMe_2(OSiMe_2)_3OSiMe_2Vi$, $-SiMe_2(OSiMe_2)_3OSiMe_3$, $-SiMe_2(OSiMe_2)_4OSiMe_2Vi$, $-SiMe_2(OSiMeCF_3)_3OSiMe_2Vi$, and $-SiMe_2(OSiMePh)_3OSiMe_2Vi$, where Me is methyl and Vi is vinyl.

Examples of halohydrocarbyl groups represented by $R^2$, $R^3$, and $R^4$ include, but are not limited to, trifluoromethyl, pentafluoroethyl, heptafluoropropyl, and 6,6,6,5,5,4,4,3,3-nonafluorohexyl.

Examples of cyanoalkyl groups represented by $R^2$ and $R^4$ include, but are not limited to, cyanomethyl, cyanoethyl, cyanopropyl, cyanobutyl, and cyanooctyl.

Examples of alkoxy groups represented by $R^2$ include, but are not limited to, methoxy, ethoxy, propoxy, isopropoxy, butoxy, isobutoxy, and pentyloxy.

Examples of alkenyloxy groups represented by $R^2$ include, but are not limited to, allyloxy, propenyloxy, hexenyloxy, and decenyloxy.

Examples of alkenyloxyalkyloxy groups represented by $R^2$ include, but are not limited to, allyloxyethyloxy and allyloxypropyloxy.

Examples of cyanoalkoxy groups represented by $R^2$ include, but are not limited to, cyanoethoxy, cyanopropoxy, and cyanobutoxy.

Examples of methacryloyloxyalkyloxy groups represented by $R^2$ include, but are not limited to, methacryloyloxyethyloxy and methacryloyloxypropyloxy.

Examples of acryloyloxyalkyloxy groups represented by $R^2$ include, but are not limited to, acryloyloxyethyloxy and acryloyloxypropyloxy.

Examples of hydrocarbyl-substituted amino groups represented by $R^2$ include, but are not limited to, methylamino, dimethylamino, and diethylamino.

Examples of acyl groups represented by $R^3$ include, but are not limited to, acetyl, propionyl, butyryl, acryloyl, methacryloyl, and stearoyl.

The alkanediyl groups represented by $R^5$ typically have from 3 to 18 carbon atoms and, preferably, have from 3 to 12 carbon atoms. Furthermore, the free valences of the alkanediyl group are typically separated by 3, 4, or 5 carbon atoms and, preferably, they are separated by 3 or 4 carbon atoms. Examples of alkanediyl groups represented by $R^5$ include, but are not limited to, $-CH_2CH_2-$, $-CH_2CH_2CH_2-$, $-CH_2CH_2CH_2CH_2-$, and $-CH_2(CH_2)_3CH_2-$.

The hydrocarbylene groups represented by $R^6$ typically have from 2 to 18 carbon atoms and preferably have from 2 to 12 carbon atoms. Furthermore, the free valences of the hydrocarbylene group are typically separated by 2, 3, or 4 carbon atoms and, preferably, they are separated by 2 or 3 carbon atoms. Examples of hydrocarbylene groups represented by $R^6$ include, but are not limited to, $-CH_2CH_2-$, $-CH_2CH_2CH_2-$, $-CH_2CH(CH_3)-$, $-CH_2(CH_3)_2CH_2-$, o-phenylene, $-C(CH_3)_2\overset{|}{C}H_2CHCH_3$, $-CH_2CH(C_2H_5)\overset{|}{C}HCH_2CH_2CH_3$, $-CH_2CH(CH_3)\overset{|}{C}HCH_2CH_3$, $-CH_2CH(CH_2CH_2CH_2CH_3)\overset{|}{C}HCH_3$, and $\overset{|}{C}-CH_2CH(CH_2CH_2CH_3)\overset{|}{C}H(CH_2)_3CH_3$ The hydrocarbylene groups represented by $R^7$ typically have from 1 to 18 carbon atoms and, preferably, have from 1 to 12 carbon atoms. Examples of hydrocarbylene groups represented by $R^7$ include, but are not limited to, —$CH_2$—, —$CH_2CH_2$—, —$CH_2CH_2CH_2$—, —$CH_2CH(CH_3)$—, —$CH_2C(CH_3)_2CH_2$—, —$CH_2CH_2CH_2CH_2$—, —$CH_2(CH_2)_3CH_2$—, —$C(CH_3)_2CH_2CH_2CH_2$—, and p-phenylene.

Examples of transition metal compounds of the present invention include, but are not limited to, those having the formulae shown in Examples 2–8 below.

The transition metal compounds of the present invention can be prepared using well-known methods of preparing titanium and zirconium alkoxides, β-dicarbonyl chelates, β-hydroxy carbonyl chelates, and glycol chelates. For example, representative methods are taught by C. S. Rondestvedt in *The Encyclopedia of Chemical Technology*, 3$^{rd}$ ed., John Wiley & Sons: New York, 1983, Vol. 23, pp 177, 179, 187, 189, and 190; R. Feld and P. L. Cowe in *The Organic Chemistry of Titanates*, Butterworth: Washington, 1965, pp 58–80; and Beers et al. in U.S. Pat. No. 4,438,039.

The transition metal compounds having formula I wherein m=0 can be prepared by treatment of a titanium or zirconium alkoxide with a hydroxy-functional compound containing at least one aliphatic carbon-carbon multiple bond:

$$M(OR)_4 + xR^1OH \rightarrow M(OR)_{4-x}(OR^1)_x + xROH$$

wherein R is C1 to C8 alkyl, x has a value from 1 to 4, and $R^1$ is as defined above, provided at least one mole of $R^1OH$ per mole of $M(OR)_4$ contains at least one aliphatic carbon-carbon multiple bond. The mole ratio of $R^1OH$ to $M(OR)_4$ can vary from 1:1 to 4:1, or more. For example a compound having the formula $M(OR^1)_4$ can be prepared by treating a titanium or zirconium alkoxide with $R^1OH$ in a molar ratio exceeding 4:1 to shift the equilibrium toward the product.

The transition metal compounds having formula I wherein m is 1, 2, or 3 and $R^1$ is alkyl can be prepared by treatment of a titanium or zirconium alkoxide having the formula $M(OR)_4$ with m moles, per mole of titanium or zirconium alkoxide, of a β-dicarbonyl compound having the formula $R^2$—C(=O)—CH($R^3$)—C(=O)—$R^4$, wherein R, $R^2$, $R^3$, $R^4$, and m are as defined above, and at least one of $R^2$, $R^3$, and $R^4$ contains at least one aliphatic carbon-carbon multiple bond. Homologues wherein $R^1$ is a higher (>C8) alkyl group can be prepared by treatment of the resulting transition metal compound with an appropriate alcohol.

The transition metal compounds having formula I wherein m is 1, 2, or 3 and $R^1$ is other than alkyl can be prepared by treatment of a titanium or zirconium alkoxide having the formula $M(OR)_4$ with m moles, per mole of titanium or zirconium alkoxide, of a β-dicarbonyl compound having the formula $R^2$—C(=O)—CH($R^3$)—C(=O)—$R^4$ followed by 4-m moles of a hydoxy-functional compound having the formula $R^1OH$, wherein $R^1$ is as defined above, excluding alkyl, R, $R^2$, $R^3$, $R^4$, and m are as defined above, and at least one of $R^1$, $R^2$, $R^3$, and $R^4$ contains at least one aliphatic carbon-carbon multiple bond.

The transition metal compounds having formula I wherein m is 4 can be prepared by treatment of a zirconium alkoxide having the formula $Zr(OR)_4$ with 4 moles, per mole of zirconium alkoxide, of a β-dicarbonyl compound having the formula $R^2$—C(=O)—CH($R^3$)—C(=O)—$R^4$ wherein R, $R^2$, $R^3$, and $R^4$ are as defined above and at least one of $R^2$, $R^3$, and $R^4$ contains at least one aliphatic carbon-carbon multiple bond.

The transition metal compounds having formula II can be prepared using the methods described above for the preparation of the transition metal compounds having formula I by replacing the β-dicarbonyl compound having the formula $R^2$—C(=O)—CH($R^3$)—C(=O)—$R^4$ with a β-dicarbonyl compound having the formula:

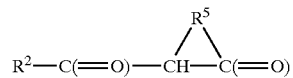

wherein $R^2$ and $R^5$ are as defined above.

The transition metal compounds having formula III can be prepared using the methods described above for the preparation of the transition metal compounds having formula I by replacing the β-dicarbonyl compound having the formula $R^2$—C(=O)—CH($R^3$)—C(=O)—$R^4$ with a β-hydroxy carbonyl compound having the formula:

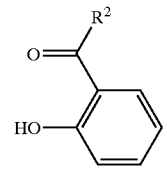

wherein $R^2$ is as defined above.

The transition metal compounds having formula IV wherein p is 1 and $R^1$ is alkyl can be prepared by treatment of a titanium or zirconium alkoxide having the formula $M(OR)_4$ with 1 mole, per mole of titanium or zirconium alkoxide, of a glycol having the formula HO—$R^6$—OH wherein R and $R^6$ are as defined above and $R^6$ contains at least one aliphatic carbon-carbon multiple bond. Homologues wherein $R^1$ is a higher (>C8) alkyl group can be prepared by treatment of the resulting transition metal compound with an appropriate alcohol.

The transition metal compounds having formula IV wherein p is 1 and $R^1$ is other than alkyl can be prepared by treatment of a titanium or zirconium alkoxide having the formula $M(OR)_4$ with 1 mole, per mole of titanium or zirconium alkoxide, of a glycol having the formula HO—$R^6$—OH followed by 2 moles of a hydroxy-functional compound having the formula $R^1OH$, wherein R, $R^1$, and $R^6$ are as defined above and at least one of $R^1$ and $R^6$ contains at least one aliphatic carbon-carbon multiple bond.

The transition metal compounds having formula IV wherein p is 2 can be prepared by treatment of a titanium or zirconium alkoxide having the formula $M(OR)_4$ with 2 moles, per mole of titanium or zirconium alkoxide, of a glycol having the formula HO—$R^6$—OH wherein R and $R^6$ are as defined above and $R^6$ contains at least one aliphatic carbon-carbon multiple bond.

Examples of titanium alkoxides include, but are not limited to, titanium methoxide, titanium n-butoxide, titanium n-propoxide, titanium isopropoxide (also referred to herein as tetra-iso-propyl titanate), titanium t-butoxide, titanium isobutoxide, and titanium 2-ethylhexoxide. Examples of zirconium alkoxides include, but are not limited to, zirconium n-propoxide, zirconium ethoxide, zirconium n-butoxide, and zirconium t-butoxide. Methods of preparing titanium and zirconium alkoxides are well known in the art; many of these compounds are commercially available. Preferably, the titanium or zirconium alkoxide, $M(OR)_4$, reacts with the hydroxy-functional compound, β-dicarbonyl compound, β-hydroxy carbonyl compound, or glycol to produce an alcohol, ROH, having a lower boiling point than any of the reactants.

Examples of hydroxy-functional compounds include, but are not limited to, undecylenyl alcohol, $ViMe_2Si(OSiMe_2)_3OSiMe_2OH$, dipropylene glycol propyl ether, trimethylolpropane diallyl ether, poly(ethylene glycol) monoallyl ether, poly(propylene glycol) monoallyl ether, $H_2C=CHCH_2(OC_3H_6)_{1.6}OH$, $H_2C=CHCH_2(OCH_2CH_2)_4OH$, and $CH_2=CHCH_2(OCH_2CH_2)_{10}[OCH_2CH(CH_3)]_4OH$, where Me is methyl and Vi is vinyl. The hydroxy-functional compound can be a single compound or a mixture of two or more different compounds. Methods of preparing hydroxy-functional compounds represented by the formula $R^1OH$, wherein $R^1$ is as defined above, are well known in the art; many of these compounds are commercially available.

Examples of β-carbonyl compounds include, but are not limited to, methyl acetoacetate, ethyl acetoacetate, ethyl trifluoroacetoacetate, allyl acetoacetate, 2,4-pentanedione, 1,1,1-trifluoropentanedione, 2,6-dimethyl-3,5-heptanedione, 2-(methacryloyloxy)ethyl acetoacetate, methyl 2-oxocyclopentanecarboxylate, methyl 2-oxocyloheptanecarboxylate, and 1-benzoylacetone. The β-dicarbonyl compound can be a single compound or a mixture of two or more different compounds. Methods of preparing β-dicarbonyl compounds, such as the Claisen condensation, are well known in the art.

Examples of β-hydroxy carbonyl compounds include, but are not limited to, methyl salicylate, ethyl salicylate, and salicylamide. The β-hydroxy carbonyl compound can be a single compound or a mixture of two or more different compounds. Methods of preparing β-hydroxy carbonyl compounds are well known in the art; many of these compounds are commercially available.

Examples of glycols include, but are not limited to, ethylene glycol, propylene glycol, 1,4-butanediol, 2-methylpentane-2,4-diol, 2,2-dimethyl-1,3-propanediol, 2-ethyl -1,3-hexanediol, 2-methyl-1,3-pentanediol, 2-propyl-1,3-heptanediol, 2-butyl-1,3-butanediol, and catechol. The glycol can be a single compound or a mixture of two or more different compounds. Methods of preparing glycols are well known in the art; many of these compounds are commercially available.

The reaction of the titanium or zirconium alkoxide with the hydroxy-functional compound, β-dicarbonyl compound, β-hydroxy carbonyl compound, or glycol, is preferably carried out in the absence of atmospheric moisture. This can be accomplished by purging the reactor with a dry inert gas, such as nitrogen, before introducing the reactants and thereafter maintaining an atmosphere of inert gas in the reactor.

The titanium or zirconium alkoxide is typically treated with the hydroxy-functional compound, β-dicarbonyl compound, β-hydroxy carbonyl compound, or glycol, at room temperature. When the alcohol produced by displacement of alkoxide from the titanium or zirconium alkoxide has a lower boiling point than any of the reactants, the equilibrium can be shifted toward the product by continuously removing the lower boiling alcohol. For example, the lower boiling alcohol can be removed by distillation under reduced pressure at a moderate temperature.

Preferably, the titanium or zirconium alkoxide is treated with the hydroxy-functional compound, β-dicarbonyl compound, β-hydroxy carbonyl compound, or glycol, by slowly adding the compound(s) to the alkoxide. Preferably, the β-dicarbonyl compound, β-hydroxy carbonyl compound, or glycol is added first, followed by the hydroxy-functional compound. Also, preferably, the reaction mixture is agitated, for example, by stirring, during each addition step.

Although the above reactions are typically carried out in the absence of a diluent, one or more of the reactants can be dissolved in a hydrocarbon solvent prior to admixture. Examples of hydrocarbon solvents include pentane, hexane, cyclohexane, toluene, and xylene.

Component (C) is present in an effective amount in the silicone composition. As used herein, the term "effective amount" means that the concentration of component (C) is such that the silicone composition cures to form a product having improved adhesion to plastic substrates compared with a similar composition either lacking the transition metal compound or containing a transition metal compound not having an aliphatic carbon-carbon multiple bond. Improved adhesion is evidenced by an increase in adhesive bond strength or a change in failure mode from adhesive to cohesive. The concentration of component (C) is typically from 0.1 to 10 percent by weight and preferably from 0.5 to 6 percent by weight, based on the total weight of the composition. When the concentration of component (C) is less than about 0.1 percent by weight, the cured silicone product typically does not exhibit a substantial improvement in adhesion. When the concentration of component (C) is greater than about 10 percent by weight, the cured silicone product typically does not exhibit further substantial improvement in adhesion.

Component (D) is a hydrosilylation catalyst that promotes the addition reaction of components (A) and (C) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s).

Microencapsulated hydrosilylation catalysts and methods of preparing them are well known in the art, as exemplified in U.S. Pat. No. 4,766,176 and the references cited therein; and U.S. Pat. No. 5,017,654.

The concentration of component (D) is sufficient to catalyze the addition reaction of components (A) and (C) with component (B). Typically, the concentration of component (E) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

The silicone composition can comprise additional ingredients, provided the ingredient does not prevent the composition from curing to form a silicone product having improved adhesion, as described above. Examples of additional ingredients include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, dialkyl fumarates, dialkenyl fumarates, dialkoxyalkyl fumarates, maleates, cyclovinylsiloxanes, and amines; dyes; pigments; adhesion promoters, such as the adhesion promoters taught in U.S. Pat. Nos. 4,087,585 and 5,194,649; anti-oxidants; heat stabilizers; UV stabilizers; flame retardants; flow control additives; reactive diluents; anti-settling agents; fillers, such as fumed silica, calcined silica, wet-method silica, quartz powder, titanium oxide, fumed titanium oxide, calcium carbonate, diatomaceous earth, clay, talc, iron oxide, zinc oxide, aluminum oxide, silicon nitride, boron nitride, diamond powder, copper powder, gold powder, silver powder, silver-coated copper, nickel powder, gold-coated copper powder, and carbon black; alcohol scavengers, such as 4-trimethylsilyloxy)-3-penten-2-one and N-(t-butyl dimethylsilyl)-N-methyltrifluoroacetamide; dessicants, such as zeolites, anhydrous aluminum sulfate, molecular sieves (preferably with a pore diameter of 10 Å or less), kieselguhr, silica gel, and activated carbon; hydrogen-absorbing substances, such as finely divided palladium, platinum or their alloys; and blowing agents, such as water, methanol, ethanol, iso-propyl alcohol, benzyl alcohol, 1,4 butanediol, 1,5 pentanediol, 1,7 heptanediol, and silanols.

The silicone composition can be a one-part composition comprising components (A) through (D) in a single part or, alternatively, a multi-part composition comprising components (A) through (D) in two or more parts, provided components (A), (B), and (D) are not present in the same part. For example, a multi-part silicone composition can comprise a first part containing a portion of component (A) and all of components (C) and (D), and a second part containing the remaining portion of component (A) and all of component (B).

The one-part silicone composition is typically prepared by combining components (A) through (D) and any optional ingredients in the stated proportions at ambient temperature with or without the aid of an organic solvent. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

The silicone composition can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; epoxies; polyesters; polycarbonates; polyphenylene oxides; ceramics; and glass.

A cured silicone product according to the present invention comprises a reaction product of the silicone composition containing components (A) through (D), described above. The silicone composition can be cured at a temperature from about room temperature to about 250° C., preferably from about room temperature to about 200° C., and more preferably from about room temperature to about 150° C., for a suitable length of time. For example, the silicone composition typically cures in less than about one hour at 150° C.

The silicone composition of the present invention has numerous advantages, including low VOC (volatile organic compound) content and adjustable cure. Moreover, the silicone composition cures to form a silicone product having superior adhesion to a wide variety of substrates, particularly plastics.

The silicone composition of the present invention, which does not require an organic solvent for many applications, has a very low VOC content. Consequently, the present silicone composition avoids the health, safety, and environmental hazards associated with solvent-borne silicone compositions. In addition, the solventless composition of the present invention typically undergoes less shrinkage during curing than solvent-borne silicone compositions.

Additionally, the silicone composition of the present invention cures rapidly at temperatures from room temperature to moderately elevated temperatures without the formation of detectable byproducts. In fact, the cure rate of the silicone composition can be conveniently adjusted by regulating the concentration of catalyst and/or optional inhibitor.

Importantly, the silicone composition of the present invention cures to form a silicone product having unexpectedly improved adhesion to plastic substrates compared with a similar composition either lacking the transition metal compound or containing a transition metal compound not having an aliphatic carbon-carbon multiple bond. Improved adhesion is evidenced by an increase in adhesive bond strength or a change in failure mode from adhesive to cohesive.

The silicone composition of the instant invention has numerous uses, particularly in the electronics field. For example, the silicone composition can be used to attach a die to a printed circuit board, encapsulate an electronic device, fill the gap between a heat sink and an electronic device, attach a heat sink to an electronic device, or encapsulate the wire windings in a power transformer or converter. In particular, the silicone composition is useful for bonding electronic components to flexible or rigid substrates.

EXAMPLES

The following examples are presented to further illustrate the silicone composition of this invention, but are not to be considered as limiting the invention, which is delineated in the appended claims. Unless otherwise noted, all parts and percentages reported in the examples are by weight.

Reagents

The following chemical substances were used in the examples:

ω-Undecylenyl alcohol (10-undecen-1-ol, 98%) is available from Aldrich (Milwaukee, Wis.).

Titanium diisopropoxide bis(ethylacetoacetate), which has the formula

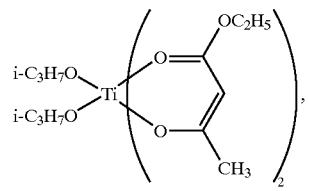

is sold under the name TYZOR DC by DuPont (Wilmington, Del.).

Allyl alcohol propoxylate has the formula $H_2C=CHCH_2(OC_3H_6)_nOH$ where n has an average value of 1.6, and the compound has a viscosity (Brookfield, 25° C.) of 5 mPa·s and an average $M_n$ (number-average molecular weight) of about 140–160. The compound is available from Aldrich (Milwaukee, Wis.).

Allyl acetoacetate (98%) is available from Aldrich (Milwaukee, Wis.).

Dipropylene glycol propyl ether, which as the formula n-$C_3H_6OC_3H6OC_3H_6OH$, is available from Aldrich (Milwaukee, Wis.).

Tetra-iso-propyl titanate, which has the formula (i-$C_3H_7O)_4Ti$, is sold under the name TYZOR TPT by DuPont (Wilmington, Del.).

Tetra-n-propyl zirconate, which has the formula (n-$C_3H_7)_4Zr$, is sold under the name TYZOR NPZ by DuPont (Wilmington, Del.).

Ethyl 4,4,4-trifluoroacetoacetate (99%) is available from Aldrich (Milwaukee, Wis.).

Undecyl alcohol (1-undecanol, 98+%) is available from Aldrich (Milwaukee, Wis.).

Silicone Base is a silicone/ground silica blend prepared by heating a mixture consisting of 35% of Polymer A and 65% of Silica in a Neulinger RDH mixer at a temperature of 80° C. under a pressure of 6754 Pa for 40 minutes.

Polymer A is a dimethylvinylsiloxy-terminated polydimethylsiloxane having a viscosity of about 0.45 Pa·s at 25° C.

Silica is a ground silica sold under the name MIN-U-SIL 5 by U.S. Silica (Berkeley Springs, W.Va.). The silica has a topsize of 5 µm (98%<5 µm), a median particle size of 1.6 µm, a tapped density of 41, an untapped density of 31, and a specific gravity of 2.65.

Catalyst is a mixture consisting of 1% of a platinum(IV) complex of 1,1-diethenyl-1,1,3,3-tetramethyldisiloxane, 92% of Polymer A, and 7% of tetramethyldivinyldisiloxane.

Crosslinking Agent is a trimethylsiloxy-terminated poly(dimethylsiloxane/methylhydrogensiloxane) having an average of 3 dimethylsiloxane units and 5 methylhydrogensiloxane units per molecule and containing about 0.8% of silicon-bonded hydrogen atoms.

Resin/Polymer Blend is a mixture consisting of (i) 27% of an organopolysiloxane resin consisting essentially of $CH_2=CH(CH_3)_2SiO_{1/2}$ units, $(CH_3)_3SiO_{1/2}$ units, and $SiO_{4/2}$ units, wherein the mole ratio of $CH_2=CH(CH_3)_2SiO_{1/2}$ units and $(CH_3)_3SiO_{1/2}$ units combined to $SiO_{4/2}$ units is about 0.7, and the resin has weight-average molecular weight of about 22,000, a polydispersity of about 5, and contains about 1.8% by weight (about 5.5 mole %) of vinyl groups, and (ii) 71% of Polymer B, a dimethylvinylsiloxy-terminated polydimethylsiloxane having a viscosity of about 55 Pa·s at 25° C.

Inhibitor is 2-methyl-3-butyn-2-ol.

Substrates

The following substrates were cut into flat panels measuring 3 in.×1 in. (7.62 cm×2.54 cm):

FR-4 is the epoxy side of a copper-clad FR-4 (glass-reinforced epoxy) laminate having a thickness of about 0.06 in. (0.152 cm), which is available from Laird Plastics (West Palm Beach, Fla.).

PC is a bisphenol A polycarbonate sheet having a thickness of about 0.25 in. (0.635 cm), which is sold under the name HYZOD M by Exotic Automation & Supply (Farmington Hills, Mich.).

PBT is a poly(butylene terephthalate) resin sheet having a thickness of about 0.25 in. (0.635 cm), which is sold under the name HYDEX 4101 (white) by Boedeker Plastics, Inc. (Shiner, Tex.).

N66 is an extruded nylon 101 type 6/6 polyamide resin sheet having a thickness of about 0.25 in. (0.635 cm), which is available from Boedeker Plastics, Inc. (Shiner, Tex.).

PPO is a styrene-modified poly(phenylene oxide) sheet having a thickness of about 0.25 in. (0.635 cm), which is sold under the name NORYL EN-265 (black) by Boedeker Plastics, Inc. (Shiner, Tex.).

PS is a 40% glass-filled crystalline polymer (syndiotactic polystyrene) sheet having a thickness of about 0.125 in. (0.318 cm), which is sold under the name QUESTRA WA 206 by The Dow Chemical Company (Midland, Mich.).

Al is an aluminum panel (2024 T3, Type AR) having a thickness of about 0.063 in. (0.160 cm).

SS is a 304 stainless steel alloy (Type SS-34) panel having a thickness of about 0.063 in. (0.160 cm), which is available from Q-Panel Lab Products (Cleveland, Ohio).

Cu is the copper side of a copper-clad FR-4 (glass-reinforced epoxy) laminate having a thickness of about 0.06 in. (0.152 cm), which is available from Laird Plastics (West Palm Beach, Fla.).

Cleaning of Substrates

Plastic substrates, except Nylon, were first cleaned in an ultrasonic bath containing a dilute soap solution to remove machine oils and other hydrocarbon residues, and then rinsed in clean water. Immediately before use, each plastic substrate was repeatedly cleaned by drawing a Kimwipe disposable wiper saturated with isopropyl alcohol over the test surface. In the final cleaning step, isopropyl alcohol was applied to the test surface using a TECHNICLOTH TX604 cleanroom wiper (The Texwipe Company, Upper Saddle River, N.J.). The test surface of each Nylon substrate was sprayed with isopropyl alcohol, wiped with a Kimwipe, sprayed with acetone, and wiped with a TECHNICLOTH TX604 cleanroom wiper. Metal substrates were cleaned in a similar manner using heptane followed by isopropyl alcohol. All substrates were allowed to air-dry for at least twenty minutes before application of a silicone composition.

Preparation of Specimens for Scrape Adhesion Testing

The freshly prepared silicone composition was drawn over the surface of a cleaned substrate with a doctor blade to achieve a film thickness of about 0.025 in. (0.0635 cm). The coated substrate was then heated in a forced air convection oven at a temperature of 70° C. for 30 minutes (Examples 9–15 and Comparative Examples 2–5) or 155° C. for 35 minutes (Comparative Example 6 and Example 16), and then allowed to cool to room temperature. The substrate was scored with a razor blade to form two parallel lines separated by about 0.25 in. (0.635 cm), penetrating through the silicone layer and into the substrate.

Measurement of Scrape Adhesion

A stainless steel microspatula (Fisherbrand 21-401-5) having rounded ends was brought into contact with the cured silicone surface between the two parallel score lines, described above, at an angle of approximately 30° from the surface. A manual force was exerted on the spatula along the track between the score lines in an attempt to scrape the silicone product from the surface of the substrate. The failure mode is reported as adhesive, cohesive, or a combination thereof. Adhesive failure is further classified as weak, moderate, or strong as an indication of the relative force required to produce failure. Adhesive failure denotes clean debonding (release) of the silicone product from the substrate. Cohesive failure denotes fracture (splitting) of the silicone product itself and adherence of residue to the substrate.

Preparation of Lap Shear Joints

The freshly prepared, de-aired silicone composition was applied to one face of a first substrate in an amount sufficient to fill the lap volume. Using shims to control the bondline thickness, the face of a second identical substrate was placed on top of the first substrate to form an overlap area measuring 1 in.×1 in. (2.54 cm×2.54 cm), except for PS (overlap area: 2.54 cm×1.27 cm). Sufficient pressure was applied to the substrates to achieve a bondline thickness of 0.025 in. (0.0635 cm). The samples were heated in a forced air convection oven at 155° C. for 35 minutes and then allowed to cool to room temperature. Excess silicone was carefully removed from the lap region with a razor blade.

Measurement of Lap Shear Adhesion

Lap-shear adhesion of a joint was determined using an MTS Sintech 5/G tensile tester (MTS Systems Corporation, Eden Prairie, Minn.) equipped with a 1000 lbf (4448.2 N) transducer operating at a crosshead speed of 2 in./minute (0.85 mm/s) under ambient conditions. The reported values for maximum shear stress represent the average of three measurements performed on identically prepared test specimens. The reported mode of failure was observed for each of the test specimens.

Example 1

1,3-Divinyltetramethyldisiloxane (300. 56 g), $ZnCl_2$ (40.39 g), and acetic anhydride (150.98 g) were added sequentially under nitrogen to a 2 liter 3-necked flask equipped with a thermometer, mechanical stirrer, and reflux condenser. The temperature of the mixture was gradually increased from 80 to 100° C. during a period of 2 hours. The mixture was cooled to 50° C. by placing the flask in an ice bath and dry toluene (478.21 g) was added to the mixture. After the addition was complete, the mixture was stirred at 40° C. for 4.5 hours. The heat source was removed, anhydrous sodium acetate (67.56 g) was added to the mixture, and stirring was continued overnight at room temperature. The liquid phase of the mixture was distilled (50° C., 1 mmHg, 133.3 Pa) to afford an acetoxypentasiloxane having the formula $ViMe_2Si(OSiMe_2)_3OSiMe_2OAc$, where Vi is vinyl, Me is methyl, and OAc is acetoxy. The acetoxy compound was added dropwise to a solution of sodium bicarbonate (7.00 g) in water (13.83 g). After the evolution of gas ceased, the aqueous mixture was extracted with n-pentane. The combined organic extracts were dried over sodium sulfate, filtered, and concentrated under reduced pressure to give 1-hydroxy-1,1,3,3,5,5,7,7,9,9-decamethyl-9-vinylpentasiloxane.

Example 2

An adhesion promoter was prepared according to the following procedure: In a glass reaction vessel under nitrogen, (o-undecylenyl alcohol was added dropwise to titanium diisopropoxide bis(ethylacetoacetate) in a 2:1 molar ratio. After the addition was complete, the reaction mixture was gradually brought to a pressure of approximately 5 mm Hg (667 Pa). The mixture was heated to about 50° C. to facilitate removal of the isopropyl alcohol by-product. The reaction was considered complete when the mass of volatile material collected in a series of dry ice and liquid nitrogen traps measured at least 90% of the theoretical yield of isopropyl alcohol. Analysis of the trapped material by gas chromatography confirmed that the condensate contained at least 90% isopropyl alcohol. The NMR spectra ($^1H$ and $^{13}C$) obtained for the reaction product (residue) are consistent with a compound having the formula:

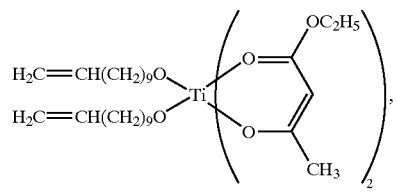

Example 3

An adhesion promoter was prepared using the method of Example 2, except allyl alcohol propoxylate was used in place of ω-undecylenyl alcohol. The NMR spectra ($^1H$ and $^{13}C$) obtained for the reaction product (residue) are consistent with a compound having the formula:

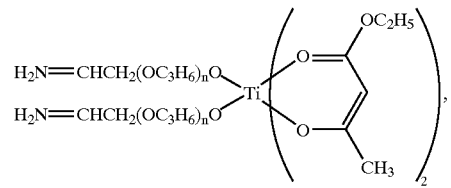

where n has an average value of 1.6.

Example 4

An adhesion promoter was prepared using the method of Example 2, except 1-hydroxy-1,1,3,3,5,5,7,7,9,9-decamethyl-9-vinylpentasiloxane (Example 1) was used in place of ω-undecylenyl alcohol. The NMR spectra ($^1H$ and $^{13}C$) obtained for the reaction product (residue) are consistent with a compound having the formula:

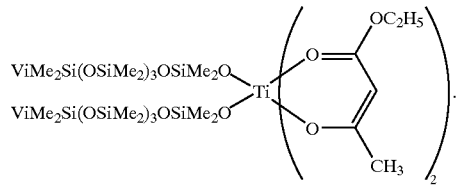

Example 5

In a glass vessel reaction vessel under nitrogen, allyl acetoacetate, and dipropylene glycol propyl ether were added sequentially in a dropwise manner to tetra-iso-propyl titanate in a 1:3:1 molar ratio. The isopropyl alcohol by-product was removed as described in Example 2. The NMR spectra ($^1H$ and $^{13}C$) obtained for the reaction product (residue) are consistent with a compound having the formula:

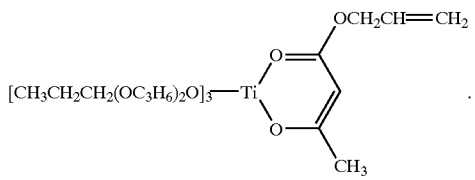

Example 6

In a glass vessel reaction vessel under nitrogen, ω-undecylenyl alcohol was added dropwise to tetra-isopropyl titanate in a 4:1 molar ratio. The isopropyl alcohol by-product was removed as described in Example 2. The NMR spectra ($^1$H and $^{13}$C) obtained for the reaction product (residue) are consistent with a compound having the formula:

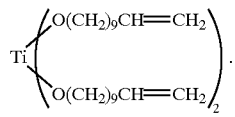

Example 7

In a glass vessel reaction vessel under nitrogen, ethyl acetoacetate and allyl alcohol propoxylate were added sequentially in a dropwise manner to tetra-n-propyl zirconate in a 2:2:1 molar ratio. The isopropyl alcohol by-product was removed as described in Example 2. The NMR spectra ($^1$H and $^{13}$C) obtained for the reaction product (residue) are consistent with a compound having the formula:

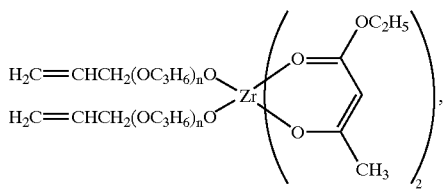

where n has an average value of 1.6.

Example 8

In a glass vessel reaction vessel under nitrogen, ethyl trifluoroacetoacetate and allyl alcohol propoxylate were added sequentially in a dropwise manner to tetra-iso-propyl titanate in 2:2:1 molar ratio. The isopropyl alcohol by-product was removed as described in Example 2. The NMR spectra ($^1$H and $^{13}$C) obtained for the reaction product (residue) are consistent with a compound having the formula:

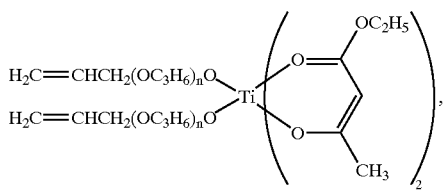

where n has an average value of 1.6.

Comparative Example 1

An adhesion promoter was prepared using the method of Example 2, except undecyl alcohol was used in place of ω-undecylenyl alcohol. The NMR spectra ($^1$H and $^{13}$C) obtained for the reaction product (residue) are consistent with a compound having the formula:

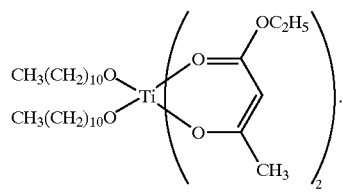

Comparative Example 2

Part A of a silicone composition was prepared by combining 109.54 parts of Silicone Base, 0.032 part of Polymer A, and 0.43 part of Catalyst in a 4-oz. polypropylene cup. The components were mixed for three consecutive 12-second cycles using a Hauschild AM-501 dental mixer. Part B was prepared by combining 101.40 parts of Silicone Base, 0.073 part of Polymer A, and 2.54 parts of Crosslinking Agent in a 4-oz. polypropylene cup and then mixing the components as described above for Part A. Equal parts by weight of Part A and Part B were combined in a polystyrene weighing dish and mixed for about 30 s using a Teflon-coated spatula. The scrape adhesion of the cured silicone product is shown in Table 1.

Example 9

Part A of Comparative Example 2 (5.00 parts) and 0.425 part of the adhesion promoter of Example 2 were combined in one region of a polystyrene weighing dish. Part B of Comparative Example 2 (5.00 parts) and 0.182 part of Crosslinking Agent were combined in an adjacent region of the weighing dish. The two portions were then mixed for about 30 s using a Teflon-coated spatula. The scrape adhesion of the cured silicone product is shown in Table 1.

Example 10

Part A of Comparative Example 2 (5.00 parts) and 0.428 part of the adhesion promoter of Example 3 were combined in one region of a polystyrene weighing dish. Part B of Comparative Example 2 (5.00 parts) and 0.199 part of Crosslinking Agent were combined in an adjacent region of the weighing dish. The two portions were then mixed for about 30 s using a Teflon-coated spatula. The scrape adhesion of the cured silicone product is shown in Table 1.

Example 11

Part A of Comparative Example 2 (4.00 parts) and 0.340 part of the adhesion promoter of Example 4 were combined in one region of a polystyrene weighing dish. Part B of Comparative Example 2 (4.00 parts) and 0.103 part of Crosslinking Agent were combined in an adjacent region of the weighing dish. The two portions were then mixed for about 30 s using a Teflon-coated spatula. The scrape adhesion of the cured silicone product is shown in Table 1.

Example 12

Part A of Comparative Example 2 (4.00 parts) and 0.336 part of the adhesion promoter of Example 5 were combined in one region of a polystyrene weighing dish. Part B of Comparative Example 2 (4.00 parts) and 0.069 part of Crosslinking Agent were combined in an adjacent region of the weighing dish. The two portions were then mixed for about 30 s using a Teflon-coated spatula. The scrape adhesion of the cured silicone product is shown in Table 1.

Example 13

Part A of Comparative Example 2 (4.00 parts) and 0.345 part of the adhesion promoter of Example 6 were combined in one region of a polystyrene weighing dish. Part B of Comparative Example 2 (4.00 parts) and 0.243 part of Crosslinking Agent were combined in an adjacent region of the weighing dish. The two portions were then mixed for about 30 s using a Teflon-coated spatula. The scrape adhesion of the cured silicone product is shown in Table 1.

Example 14

Part A of Comparative Example 2 (4.00 parts) and 0.342 part of the adhesion promoter of Example 7 were combined in one region of a polystyrene weighing dish. Part B of Comparative Example 2 (4.00 parts) and 0.152 part of Crosslinking Agent were combined in an adjacent region of the weighing dish. The two portions were then mixed for about 30 s using a Teflon-coated spatula. The scrape adhesion of the cured silicone product is shown in Table 1.

Example 15

Part A of Comparative Example 2 (5.00 parts) and 0.423 part of the adhesion promoter of Example 8 were combined in one region of a polystyrene weighing dish. Part B of Comparative Example 2 (5.00 parts) and 0.156 part of Crosslinking Agent were combined in an adjacent region of the weighing dish. The two portions were then mixed for about 30 s using a Teflon-coated spatula. The scrape adhesion of the cured silicone product is shown in Table 1.

Comparative Example 3

Part A of Comparative Example 2 (5.00 parts) and 0.205 part of titanium diisopropoxide bis(ethylacetoacetate) were combined in one region of a polystyrene weighing dish. Part B of Comparative Example 2 (5.00 parts) was placed in an adjacent region of the weighing dish. The two portions were then mixed for about 30 s using a Teflon-coated spatula. The scrape adhesion of the cured silicone product is shown in Table 1.

Comparative Example 4

Part A of Comparative Example 2 (5.00 parts) and 0.417 part of titanium diisopropoxide bis(ethylacetoacetate) were combined in one region of a polystyrene weighing dish. Part B of Comparative Example 2 (5.00 parts) was placed in an adjacent region of the weighing dish. The two portions were then mixed for about 30 s using a Teflon-coated spatula. The scrape adhesion of the cured silicone product is shown in Table 1.

Comparative Example 5

Part A of Comparative Example 2 (4.00 parts) and 0.333 part of the adhesion promoter of Comparative Example 1 were combined in one region of a polystyrene weighing dish. Part B of Comparative Example 2 (4.00 parts) was placed in an adjacent region of the weighing dish. The two potions were then mixed for about 30 s using a Teflon-coated spatula. The scrape adhesion of the cured silicone product is shown in Table 1.

TABLE 1

|  | Scrape Adhesion | |
| --- | --- | --- |
| Example | FR-4 | PPO |
| Comp. 2 | wAF | wAF |
| 9 | CF | CF |
| 10 | CF | CF |
| 11 | CF | CF |
| 12 | sAF | mAF |
| 13 | CF | CF |
| 14 | sAF | mAF |
| 15 | sAF | sAF |
| Comp. 3 | wAF | wAF |
| Comp. 4 | wAF | wAF |
| Comp. 5 | wAF | wAF | wAF denotes weak adhesive failure;
mAF denotes moderate adhesive failure;
sAF denotes strong adhesive failure; and
CF denotes cohesive failure.

Comparative Example 6

A silicone Composition was prepared by treating 60.91 parts of Resin/Polymer Blend sequentially with parts of Silica, 2.08 parts of Crosslinking Agent, 0.21 part of Inhibitor, and 0.20 part of Catalyst in a 4-oz. polypropylene cup. After the addition of each component, the mixture was blended for 12 seconds using a Hauschild AM-501 dental mixer. The scrape adhesion of the cured silicone product on various substrates and the lap shear adhesion of the silicone product on PS are shown in Table 2 and Table 3, respectively.

Example 16

To 25.00 parts of the silicone composition of Comparative Example 6 was added sequentially 0.515 part of the adhesion promoter of Example 3 and 0.223 part of Crosslinking Agent in a 4-oz. polypropylene cup. After the addition of each component, the mixture was blended for 12 seconds using a Hauschild AM-501 dental mixer. The scrape adhesion of the cured silicone product on various substrates and the lap shear adhesion of the silicone product on PS are shown in Table 2 and Table 3, respectively.

TABLE 2

| | Scrape Adhesion | | | | | | | | |
| --- | --- | --- | --- | --- | --- | --- | --- | --- | --- |
| Example | FR-4 | PC | PBT | N66 | PS | PPO | Al | SS | Cu |
| Comp. 6 | CF | wAF | wAF | wAF | wAF | wAF | wAF | wAF | wAF |
| 16 | CF | CF | sAF/CF | CF | CF | sAF/CF | wAF | CF | CF | wAF denotes weak adhesive failure; sAF denotes strong adhesive failure; CF denotes cohesive failure; and sAF/CF denotes a combination of strong adhesive and cohesive failure modes.

TABLE 3

| | Lap Shear Adhesion | |
|---|---|---|
| Example | Maximum Stress (kPa) | Failure Mode |
| Comp. 6 | — | wAF (100%) |
| 16 | 2,263 | CF (100%) |

—Denotes a value not measurable due to rapid adhesive failure,
wAF denotes weak adhesive failure,
CF denotes cohesive failure, and
value in parenthesis denotes percentage of test area exhibiting indicated failure mode.

That which is claimed is:

1. A silicone composition comprising:
   (A) an organopolysiloxane containing an average of at least two silicon-bonded alkenyl groups per molecule;
   (B) an organohydrogenpolysiloxane containing an average of at least two silicon-bonded hydrogen atoms per molecule in a concentration sufficient to cure the composition;
   (C) an effective amount of a transition metal compound having a formula selected from:

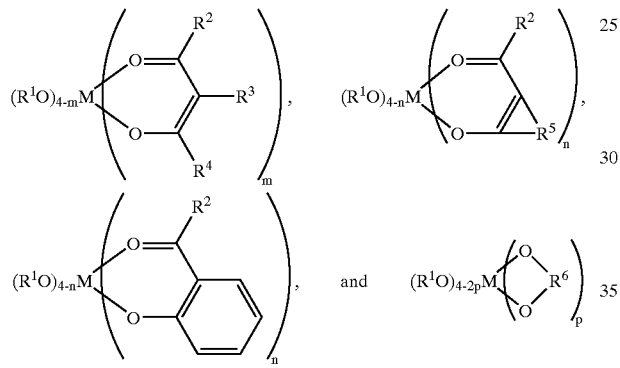

wherein each $R^1$ is independently hydrocarbyl, $-(R^7O)_qR^8$, $-SiR^9_2(OSiR^9_2)_rOSiR^9_3$, epoxy-substituted hydrocarbyl, acryloyloxy-substituted hydrocarbyl, methacryloyloxy-substituted hydrocarbyl, amino-substituted hydrocarbyl, or hydrocarbylamino-substituted hydrocarbyl, wherein $R^7$ is hydrocarbylene, $R^8$ is hydrocarbyl, $R^9$ is hydrocarbyl, q is from 1 to 20, and r is from 0 to 20; each $R^2$ is independently hydrocarbyl, halohydrocarbyl, cyanoalkyl, alkoxy, alkenyloxy, alkenyloxyalkyloxy, cyanoalkoxy, methacryloyloxyalkyloxy, acryloyloxyalkyloxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; M is titanium or zirconium; m is an integer from 0 to 3 when M is titanium or an integer from 0 to 4 when M is zirconium; n is an integer from 1 to 3 when M is titanium or an integer from 1 to 4 when M is zirconium; and p is 1 or 2; provided at least one $R^1$, $R^2$, $R^3$, $R^4$, $R^5$, or $R^6$ per molecule contains at least one aliphatic carbon-carbon multiple bond; and
   (D) a catalytic amount of a hydrosilylation catalyst.

2. The silicone composition according to claim 1, wherein the organopolysiloxane is a polydiorganosiloxane.

3. The silicone composition according to claim 1, wherein the concentration of component (B) is sufficient to provide from 0.5 to 5 silicon-bonded hydrogen atoms per alkenyl group in components (A) and (C) combined.

4. The silicone composition according to claim 1, wherein at least one $R^1$ in the transition metal compound contains at least one aliphatic carbon-carbon multiple bond.

5. The silicone composition according to claim 4, wherein $R^1$ has a formula selected from $-CH_2(CH_2)_8CH=CH_2$ and $-[CH(CH_3)CH_2O]_nCH_2CH=CH_2$, wherein n has an average value of 1.6.

6. The silicone composition according to claim 1, wherein the carbon-carbon multiple bond in the transition metal compound is located at a terminal position.

7. The silicone composition according to claim 6, wherein the carbon-carbon multiple bond in the transition metal compound is part of a terminal group having the formula $-CH=CH_2$.

8. The silicone composition according to claim 1, wherein the transition metal compound has the formula:

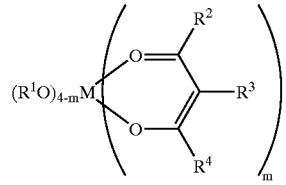

wherein $R^1$, $R^2$, $R^3$, $R^4$, and m are as defined above.

9. The silicone composition according to claim 8, wherein $R^2$ is $-OCH_2CH_3$, $R^3$ is $-H$, and $R^4$ is $CH_3$.

10. The silicone composition according to claim 1, wherein the transition metal compound has the formula:

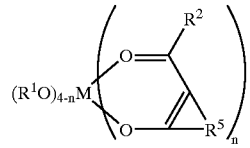

wherein $R^1$, $R^2$, $R^5$, and n are as defined above.

11. The silicone composition according to claim 1, wherein the transition metal compound has the formula:

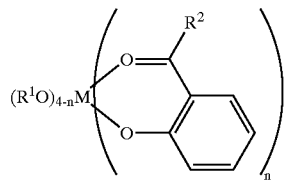

wherein $R^1$, $R^2$, and n are as defined above.

12. The silicone composition according to claim 1, wherein the transition metal compound has the formula:

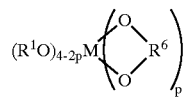

wherein $R^1$, $R^6$, and p are as defined above.

13. The silicone composition according to claim 1, wherein the concentration of the transition metal compound is from 0.1 to 10% by weight, based on the total weight of the composition.

14. A cured silicone product comprising a reaction product of the composition of claim 1.

15. A cured silicone product comprising a reaction product of the composition of claim 4.

16. A cured silicone product comprising a reaction product of the composition of claim 6.

17. A cured silicone product comprising a reaction product of the composition of claim 8.

18. A cured silicone product comprising a reaction product of the composition of claim 10.

19. A cured silicone product comprising a reaction product of the composition of claim 11.

20. A cured silicone product comprising a reaction product of the composition of claim 12.

21. A multi-part silicone composition, comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an effective amount of a transition metal compound having a formula selected from:

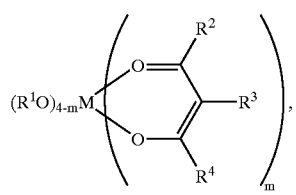, 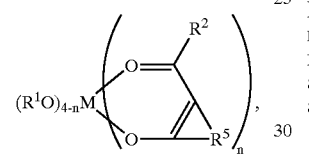, and 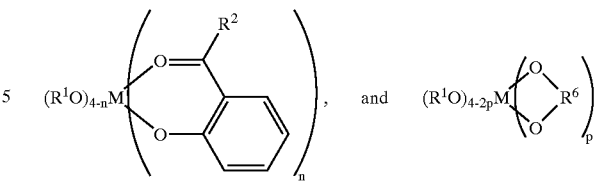

wherein each $R^1$ is independently hydrocarbyl, $-(R^7O)_qR^8$, $-SiR^9{}_2(OSiR^9{}_2)_rOSiR^9{}_3$, epoxy-substituted hydrocarbyl, acryloyloxy-substituted hydrocarbyl, methacryloyloxy-substituted hydrocarbyl, amino-substituted hydrocarbyl, or hydrocarbylamino-substituted hydrocarbyl, wherein $R^7$ is hydrocarbylene, $R^8$ is hydrocarbyl, $R^9$ is hydrocarbyl, q is from 1 to 20, and r is from 0 to 20; each $R^2$ is independently hydrocarbyl, halohydrocarbyl, cyanoalkyl, alkoxy, alkenyloxy, alkenyloxyalkyloxy, cyanoalkoxy, methacryloyloxyalkyloxy, acryloyloxyalkyloxy, amino, or hydrocarbyl-substituted amino; each $R^3$ is independently hydrogen, hydrocarbyl, halohydrocarbyl, or acyl; each $R^4$ is independently hydrocarbyl, halohydrocarbyl, or cyanoalkyl; $R^5$ is alkanediyl, wherein the free valencies are separated by 3, 4, or 5 carbon atoms; $R^6$ is hydrocarbylene, wherein the free valencies are separated by 2, 3, or 4 carbon atoms; M is titanium or zirconium; m is an integer from 0 to 3 when M is titanium or an integer from 0 to 4 when M is zirconium; n is an integer from 1 to 3 when M is titanium or an integer from 1 to 4 when M is zirconium; and p is 1 or 2; provided at least one $R^1$, $R^2$, $R^3$, $R^4$, $R^5$, or $R^6$ per molecule contains at least one aliphatic carbon-carbon multiple bond; and (D) a catalytic amount of a hydrosilylation catalyst; provided components (A), (B), and (D) are not present in the same part.

* * * * *